United States Patent
Fukushima

(10) Patent No.: US 8,284,520 B2
(45) Date of Patent: Oct. 9, 2012

(54) MAGNETIC RECORDING MEDIUM, METHOD FOR PRODUCING MAGNETIC RECORDING MEDIUM, AND MAGNETIC RECORDING/REPRODUCING APPARATUS

(75) Inventor: Masato Fukushima, Ichihara (JP)

(73) Assignee: Showa Denko K.K., Tokyo (JP)

( * ) Notice: Subject to any disclaimer, the term of this patent is extended or adjusted under 35 U.S.C. 154(b) by 146 days.

(21) Appl. No.: 12/921,095

(22) PCT Filed: Mar. 3, 2009

(86) PCT No.: PCT/JP2009/053918
§ 371 (c)(1),
(2), (4) Date: Sep. 3, 2010

(87) PCT Pub. No.: WO2009/110444
PCT Pub. Date: Sep. 11, 2009

(65) Prior Publication Data
US 2011/0013311 A1    Jan. 20, 2011

(30) Foreign Application Priority Data
Mar. 5, 2008    (JP) ................................. 2008-054636

(51) Int. Cl.
*G11B 5/82*    (2006.01)
(52) U.S. Cl. ....................................... 360/131
(58) Field of Classification Search .................... 360/131
See application file for complete search history.

(56) References Cited

U.S. PATENT DOCUMENTS

| | | | |
|---|---|---|---|
| 5,520,981 A * | 5/1996 | Yang et al. ................. | 428/848.1 |
| 6,043,947 A * | 3/2000 | Gooch et al. ................. | 360/318 |
| 6,603,637 B1 * | 8/2003 | Segar et al. ................. | 360/122 |
| 6,949,004 B1 * | 9/2005 | Broussalian et al. ............ | 451/5 |
| 7,067,207 B2 | 6/2006 | Kamata et al. | |
| 7,106,531 B2 * | 9/2006 | Bandic et al. .................. | 360/17 |
| 7,147,790 B2 | 12/2006 | Wachenschwanz et al. | |
| 7,161,753 B2 | 1/2007 | Wachenschwanz et al. | |
| 7,323,258 B2 * | 1/2008 | Kamata et al. ................ | 428/827 |
| 7,549,209 B2 | 6/2009 | Wachenschwanz et al. | |
| 7,572,528 B2 * | 8/2009 | Yamamoto et al. ........ | 428/833.2 |

(Continued)

FOREIGN PATENT DOCUMENTS

JP    05-205257 A    8/1993

(Continued)

OTHER PUBLICATIONS

Translation of Chinese Office Action issued in counterpart Chinese Patent Application No. 200980116115.4 dated Jan. 18, 2012.

*Primary Examiner* — Mark Blouin

(74) *Attorney, Agent, or Firm* — Sughrue Mion, PLLC

(57) ABSTRACT

A magnetic recording medium comprising a magnetic layer having a magnetic recording pattern comprising elevations constituting magnetic recording regions and depressions constituting boundary regions for partitioning the magnetic recording regions, and a continuous protective carbon overcoat on the magnetic layer, characterized in that portions of the carbon overcoat located on the magnetic recording regions-constituting elevations of the magnetic layer are thicker than portions of the carbon overcoat located on the boundary regions-constituting depressions of the magnetic layer. The protective carbon overcoat is formed by a CVD method. The boundary regions-constituting depressions are preferably subjected to exposure to plasma, and have modified magnetic characteristics. The magnetic recording regions exhibit high corrosion resistance and the magnetic recording medium has enhanced environmental resistance.

5 Claims, 4 Drawing Sheets

U.S. PATENT DOCUMENTS

| | | | |
|---|---|---|---|
| 8,116,035 B2 * | 2/2012 | Takahashi et al. | 360/131 |
| 2004/0091748 A1 | 5/2004 | Kamata et al. | |
| 2004/0101713 A1 | 5/2004 | Wachenschwanz et al. | |
| 2004/0257703 A1 * | 12/2004 | Honda et al. | 360/128 |
| 2005/0120545 A1 | 6/2005 | Wachenschwanz et al. | |
| 2005/0135010 A1 * | 6/2005 | Liu et al. | 360/135 |
| 2006/0171051 A1 | 8/2006 | Wachenschwanz et al. | |
| 2007/0230055 A1 * | 10/2007 | Shirotori et al. | 360/135 |
| 2008/0037173 A1 * | 2/2008 | Saito et al. | 360/135 |
| 2008/0291572 A1 | 11/2008 | Sakurai et al. | |

FOREIGN PATENT DOCUMENTS

| | | |
|---|---|---|
| JP | 2004-164692 A | 6/2004 |
| JP | 2004-178793 A | 6/2004 |
| JP | 2004-178794 A | 6/2004 |
| JP | 2006-031849 A | 2/2006 |
| JP | 2006-031852 A | 2/2006 |
| JP | 2006-209952 A | 8/2006 |
| JP | 2006-309841 A | 11/2006 |
| JP | 2008-293573 A | 12/2008 |
| WO | 2009/017016 A1 | 2/2009 |

* cited by examiner

Step A

Step B

Step C

Step D

Step E

Step F

Step G

Step H

Step I

MAGNETIC RECORDING MEDIUM, METHOD FOR PRODUCING MAGNETIC RECORDING MEDIUM, AND MAGNETIC RECORDING/REPRODUCING APPARATUS

TECHNICAL FIELD

This invention relates to a magnetic recording medium used for a magnetic recording/reproducing apparatus such as a hard disk drive, and to a method for producing the magnetic recording medium. It further relates to a magnetic recording/reproducing apparatus.

BACKGROUND ART

In recent years, magnetic recording/reproducing apparatuses such as a magnetic disk apparatus, a flexible disk apparatus and a magnetic tape apparatus are widely used with their importance being increasing. Recording density of a magnetic recording medium used in the magnetic recording apparatus is greatly enhanced. Especially, since the development of MR head and PRML technique, the areal recording density is more and more increasing. Recently GMR head and TMR head have been developed, and the rate of increase in the areal recording density is about 100% per year. There is still increasing a demand for further enhancing the recording density, and therefore, a magnetic layer having a higher coercive force, and a higher signal-to-noise ratio (SNR) and a high resolution are eagerly desired.

An attempt of increasing the track density together with an increase of a liner recording density to enhance an areal recording density is also being made.

In a recent magnetic recording/reproducing apparatus, the track density has reached about 110 kTPI. However, with an increase of the track density, magnetic recording information is liable to interfering with each other between adjacent tracks, and magnetization transition regions in the boundary regions thereof as a noise source tend to impair the SNR. These problems result in lowering in bit error rate and impede the enhancement of the recording density.

To enhance the areal recording density, it is required to render small the size of each recording bit and give the maximum saturated magnetization and magnetic film thickness to each recording bit. However, with a decrease in the bit size, the minimum magnetization volume per bit becomes small, and the recorded data tend to disappear due to magnetization reversal caused by heat fluctuation.

Further, in view of the reduction in distance between the adjacent tracks, a high-precision track servo system technology is required for the magnetic recording/reproducing apparatus, and an operation is generally adopted wherein recording is carried out widely but the reproduction is carried out narrowly so that the influence of the adjacent tracks is minimized. This operation is advantageous in that the influence of the adjacent tracks can be minimized, but it is disadvantageous in that the reproduction output is rather low. This also leads to difficulty in enhancement of the SNR to a desired high level.

To reduce the heat fluctuation, maintain the desired SNR and obtain the desired reproduction output, a proposal has been made wherein elevations and depressions are formed, which extend along the tracks on a surface of a magnetic recording medium, so that each of patterned tracks on the elevations is partitioned by the depressions whereby the track density is enhanced. This type of magnetic recording media is hereinafter referred to as discrete track media, and the technique for providing this type of magnetic recording media is hereinafter referred to as a discrete track method.

Patterned media wherein data areas in the same track are further divided are also proposed to be produced.

An example of the discrete track medium is a magnetic recording medium disclosed in, for example, patent document 1, which is made by providing a non-magnetic substrate having a pattern with elevations and depressions formed on the surface thereof, and forming a magnetic layer having a corresponding surface configuration on the non-magnetic substrate, to give physically discrete magnetic recording tracks and servo signal patterns (see, for example, patent document 1).

The above-mentioned magnetic recording medium has a multilayer structure such that a ferromagnetic layer is formed via a soft magnetic underlayer on the non-magnetic substrate having the pattern with elevations and depressions, which are formed on the surface thereof, and a protective overcoat is formed on the ferromagnetic layer. The magnetic recording pattered regions form magnetic recording regions on the elevations which are physically partitioned from the surrounding regions.

In the above-mentioned magnetic recording medium, the occurrence of ferromagnetic domain wall in the soft magnetic underlayer can be prevented or minimized and therefore the influence due to the heat fluctuation is reduced and the interfere between the adjacent signals is minimized with the result of provision of a magnetic recording medium with high recording density exhibiting a large SNR.

The discrete track method includes two type of methods: a first type method wherein tracks are formed after the formation of a multilayer magnetic recording medium comprising several laminated films; and a second type method wherein patterns having elevations and depressions are formed on a surface of a substrate, and then a magnetic layer is formed (see, for example, patent document 2 and patent document 3).

Another discrete track method has been proposed wherein a previously formed continuous magnetic layer is, for example, subjected to an implantation of nitrogen ion or oxygen ion or irradiated with a laser whereby regions partitioning magnetic tracks having modified magnetic properties are formed in the discrete track medium (see, for example, patent documents 4 to 6).

Patent document 1 JP 2004-164692 A1
Patent document 2 JP 2004-178793 A1
Patent document 3 JP 2004-178794 A1
Patent document 4 JP H5-205257 A1
Patent document 5 JP 2006-209952 A1
Patent document 6 JP 2006-309841 A1

DISCLOSURE OF THE INVENTION

Problems to Be Solved by the Invention

In the production process for the manufacture of the above-mentioned discrete track media or patterned media, which have a partitioned magnetic recording pattern, a procedure is adopted for providing the partitioned magnetic recording pattern comprising magnetic recording regions and boundary regions partitioning the magnetic recording regions. That is, regions in a magnetic layer to be formed into the boundary regions are exposed to a reactive plasma or reactive ion, using for example, oxygen or halogen, or subjected to ion-implantation using, for example, oxygen or halogen (this procedure is hereinafter called "a magnetic layer-modifying procedure" when appropriate. More specifically, in the manufacturing process of the above-mentioned media, a mask layer is formed on a magnetic layer, the mask layer is subjected to patterning by a photolithography technique, the boundary regions in the magnetic recording pattern are exposed to a reactive plasma or a reactive ion, or subjected to ion-implantation so that the magnetic characteristics in the boundary regions are degraded or the boundary regions are demagnetized to give the above-mentioned discrete track media or patterned media.

The above-mentioned magnetic layer-modifying procedure is advantageous in that the production process is simple and undesirable contamination occurring in the production process can be avoided or minimized, as compared with the conventional procedure for providing a partitioned magnetic recording pattern wherein boundary regions-constituting depressions are formed and then the depressions are filled with a non-magnetic material by a physical procedure and the surface of the filled regions is smoothed (this conventional procedure is called "magnetic layer-physical treatment procedure" when appropriate).

Even when the regions for partitioning the magnetic recording regions in the magnetic recording pattern are formed by the above-mentioned magnetic layer-modifying procedure, the surface of the magnetic layer is etched only to a slight extent by the exposure to ion or ion implantation, therefore, there is a slight height difference the surfaces of boundary regions and the surfaces of the magnetic recording regions. It is possible to delete this slight height difference by filling the boundary regions with another material and smoothing the filled regions, but this procedure is not advantageous for the same reasons for the above-mentioned magnetic layer-modifying procedure.

In general, a surface of a magnetic recording medium is required to be highly smooth. In the case when the magnetic recording pattern comprises elevations constituting magnetic recording regions and depressions constituting boundary regions, if a carbon thin film is formed on the magnetic recording pattern by the CVD method, the resulting carbon thin film has an uneven thickness due to the feature inherent to the CVD method. That is, the portions of carbon thin film located on the depressions are thicker than the portions of carbon thin film located on the elevations. It is presumed that the boundary regions-constituting depressions have a roughened surface formed by exposure to a reactive plasma or reactive ion, or by ion-implantation, to which a reactive radical is easily adhered. When a carbon thin film is formed thereon by the CVD method, formation of carbon nucleus occurs preferentially in the depressions with the result of formation of thick carbon film thereon. This tendency of forming the carbon film having thick portions on the boundary regions-constituting depressions and thin portions on the magnetic regions-constituting elevations is advantageous only for providing a magnetic recording medium having enhanced surface smoothness.

A protective carbon overcoat formed on the surface of a magnetic recording medium has a function of preventing corrosion (oxidation) of the magnetic layer occurring due to, for example, moisture in the air, in addition to protection of the magnetic recording medium from contact with a head. The present inventor found that, when the protective carbon overcoat is thin in the portions on the magnetic recording regions as compared with the portions on the boundary regions, especially non-magnetic boundary regions, corrosion occurs at a high rate in the magnetic recording regions. The research of the inventor revealed that this occurrence of corrosion is due to the fact that there is a height difference between the surface of the portions of protective carbon overcoat on the magnetic recording regions and the surface of the portions of protective carbon overcoat on the boundary regions, in addition to the fact that the thickness of the portions thereof on the magnetic recording regions is thinner than the portions thereof on the boundary regions. That is, when a protective carbon overcoat has an uneven thickness and the thin portions thereof are located on regions which are easily corroded, the corrosion in said regions proceeds at a high rate.

A primary object of the present invention is to provide a magnetic recording medium, which has enhanced resistance to corrosion occurring in magnetic recording regions in the magnetic layer, and exhibits enhanced environmental resistance.

Means for Solving the Problems

To solve the above-mentioned problems, the present inventor made extensive researches and has completed the present invention.

Thus, in accordance with the present invention, there are provided the following magnetic recording mediums (1) through (6), the following methods for producing a magnetic recording medium (7) though (12), and the following magnetic recording/reproducing apparatus (13).

(1) A magnetic recording medium comprising a magnetic layer having a magnetic recording pattern comprising elevations constituting magnetic recording regions and depressions constituting boundary regions for partitioning the magnetic recording regions, and a continuous protective carbon overcoat on the magnetic layer, characterized in that portions of the carbon overcoat located on the magnetic recording regions-constituting elevations of the magnetic layer are thicker than portions of the carbon overcoat located on the boundary regions-constituting depressions of the magnetic layer.

(2) The magnetic recording medium as described above in (1), wherein the boundary regions have modified magnetic characteristics.

(3) The magnetic recording medium as described above in (1) or (2), wherein difference in height between the magnetic recording regions-constituting elevations of the magnetic layer and the boundary regions-constituting depressions of the magnetic layer is within the range of 0.1 nm to 9 nm.

(4) The magnetic recording medium as described above in any one of (1) to (3), wherein difference in height between the upper surface of the portions of carbon overcoat located on the elevations of the magnetic layer and the upper surface of the portions of carbon overcoat located on the depressions of the magnetic layer is within the range of 1 nm to 10 nm.

(5) The magnetic recording medium as described above in any one of (1) to (4), wherein the portions of carbon overcoat located on the elevations of the magnetic layer have a thickness in the range of 1 nm to 5 nm.

(6) The magnetic recording medium as described above in any one of (1) to (5), wherein the boundary regions constituted by the depressions in the magnetic layer are comprised of an oxide.

(7) A method for producing a magnetic recording medium comprising the steps of:

forming a magnetic layer having a magnetic recording pattern comprising elevations constituting magnetic recording regions and depressions constituting boundary regions for partitioning the magnetic recording regions, and forming a continuous protective carbon overcoat on the magnetic layer, characterized in that the formation of the continuous carbon overcoat is carried out by a CVD method in a manner such that portions of the carbon overcoat located on the magnetic recording regions-constituting elevations of the magnetic layer are thicker than portions of the carbon overcoat located on the boundary regions-constituting depressions of the magnetic layer.

(8) The method for producing a magnetic recording medium as described above in (7), wherein regions in a continuous magnetic layer to be formed into the boundary regions are subjected to ion-milling to form a magnetic recording pattern comprising the magnetic recording regions-constituting elevations and the boundary regions-constituting depressions, and then, the continuous protective carbon overcoat is formed on the magnetic layer.

(9) The method for producing a magnetic recording medium as described above in (8), wherein, after the step of formation of the magnetic layer having a magnetic recording pattern comprising the magnetic recording regions-constituting elevations and the boundary regions-constituting depressions by ion-milling the regions in a continuous magnetic layer, but prior to the step of formation of the protective carbon overcoat, a step of modifying the magnetic characteristics of the boundary regions is carried out by exposing the ion-milled boundary regions to a reactive plasma or a reactive ion, or by conducting ion-implantation in the ion-milled boundary regions.

(10) A method for producing a magnetic recording medium comprising the following steps (a) through (f) which are carried out in this order:

(a) forming a continuous magnetic layer on a surface of a non-magnetic substrate;

(b) forming a mask layer for forming a magnetic recording pattern on the magnetic layer;

(c) subjecting the mask layer to patterning;

(d) subjecting, to ion-milling, regions to be formed into boundary regions for partitioning magnetic recording regions in the magnetic layer, while the mask layer remains on the regions to be formed into the magnetic recording regions, whereby elevations constituting the magnetic recording regions and depressions constituting the boundary regions are formed in the magnetic layer;

(e) removing the mask layer; and then, (f) forming by a CVD method a continuous protective carbon overcoat on the magnetic layer, in a manner such that portions of the carbon overcoat located on the magnetic recording regions-constituting elevations of magnetic layer are thicker than portions of the carbon overcoat located on the boundary regions-constituting depressions of magnetic layer.

(11) The method for producing a magnetic recording medium as described above in (10), which further comprises a step of modifying the magnetic characteristics of the boundary regions of magnetic layer, after the ion-milling step (d) but prior to the mask layer-removing step (e), wherein the ion-milled boundary regions are exposed to a reactive plasma or a reactive ion, or ion-implantation is carried out in the ion-milled boundary regions.

(12) The method for producing a magnetic recording medium as described above in (10) or (11), wherein the continuous protective carbon overcoat such that portions of the carbon overcoat located on the magnetic recording regions-constituting elevations of magnetic layer are thicker than portions of the carbon overcoat located on the boundary regions-constituting depressions of magnetic layer is formed in the protective carbon overcoat-forming step (f) by adopting a procedure selected from the following procedures [1], [2] and [3]:

[1] a procedure of forming the protective carbon overcoat by a CVD method while a bias voltage is imposed to the substrate in the protective carbon overcoat-forming step (f),

[2] a procedure of conducting ion-implantation in the magnetic recording regions and the boundary regions in the magnetic layer after the mask layer-removing step (e) but prior to the formation of the protective carbon overcoat in the step (f), and

[3] a procedure of conducting ion-implantation in the magnetic recording regions in magnetic layer while the mask remains on the boundary regions in magnetic layer after the mask layer-removing step (e) but prior to the formation of the protective carbon overcoat in the step (f), whereby the magnetic recording regions are roughened.

(13) A magnetic recording/reproducing apparatus characterized by comprising, in combination, the magnetic recording medium as described above in any one of (1) to (6), or the magnetic recording medium produced by the method as described above in any one of (7) to (12); a driving part for driving the magnetic recording medium in the recording direction; a magnetic head comprising a recording part and a reproducing part; means for moving the magnetic head in a relative motion to the magnetic recording medium; and a recording-and-reproducing signal treating means for inputting signal to the magnetic head and for reproducing output signal from the magnetic head.

EFFECT OF THE INVENTION

The magnetic recording medium according to the present invention is characterized as having enhanced resistance to corrosion occurring in magnetic recording regions in the magnetic layer, and exhibiting enhanced environmental resistance under high-temperature and high-humidity conditions. The magnetic recording medium can be produced with high productivity by the method of the present invention.

REFERENCE NUMERALS

Figure 1:
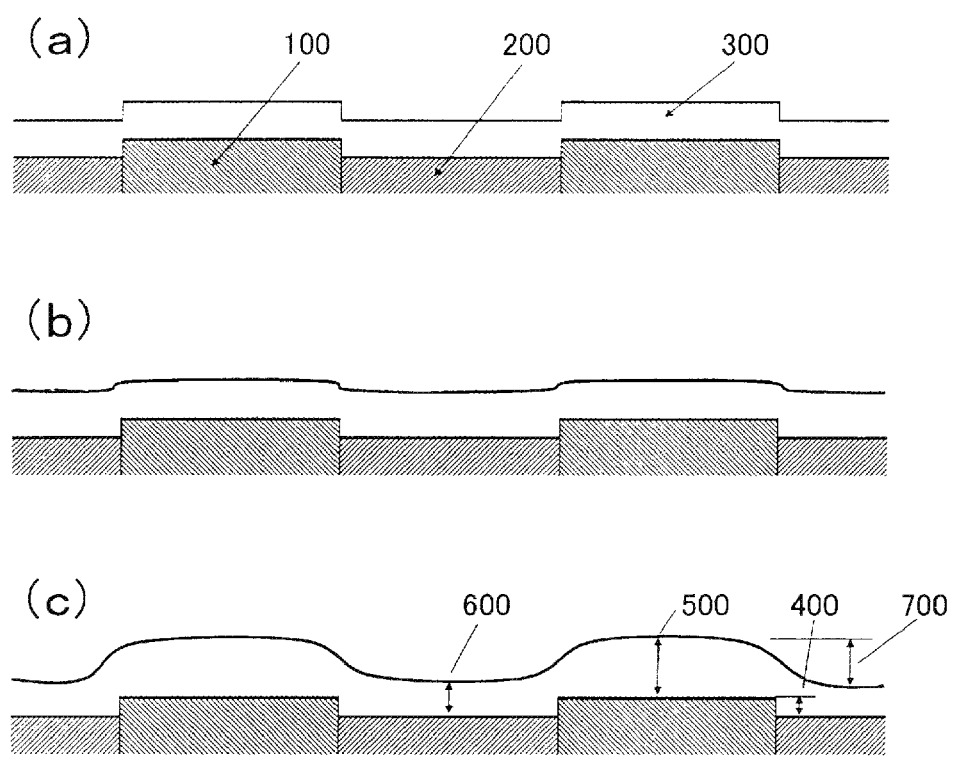
FIG. 1 is a sectional view illustrating a laminate structure of the magnetic recording medium according to the present invention.
Figure 2:
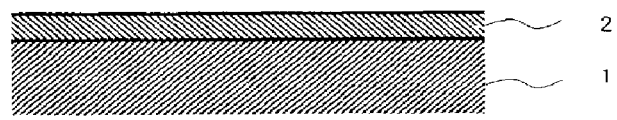
FIG. 2 is a flow-sheet of the first-half steps in a method for producing a magnetic recording medium according to the present invention.
Figure 2:
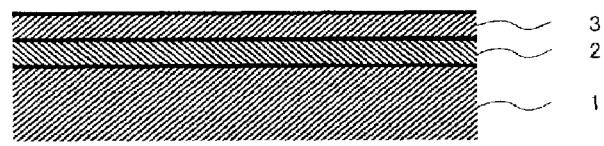
Figure 2:
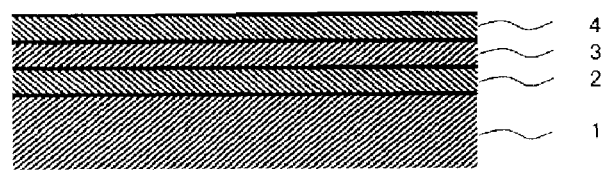
Figure 2:
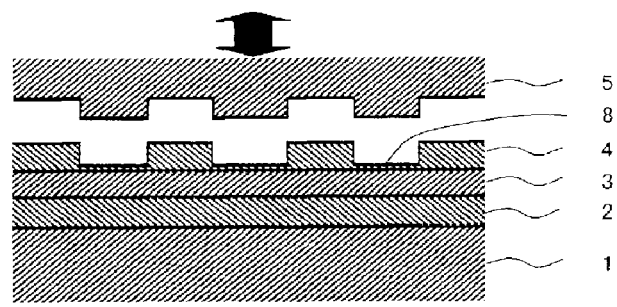
Figure 2:
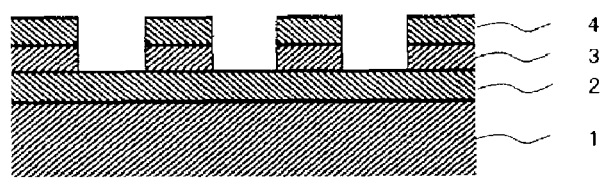
Figure 3:
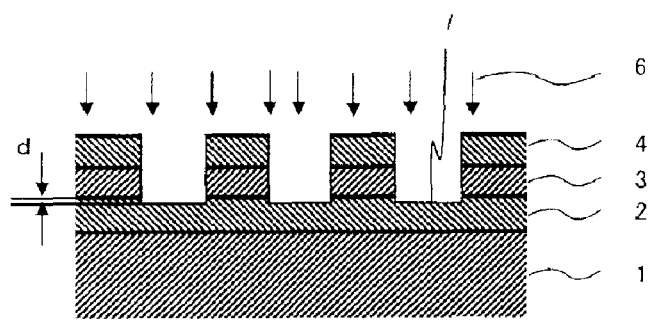
FIG. 3 is a flow-sheet of the second-half steps in a method for producing a magnetic recording medium according to the present invention.
Figure 3:
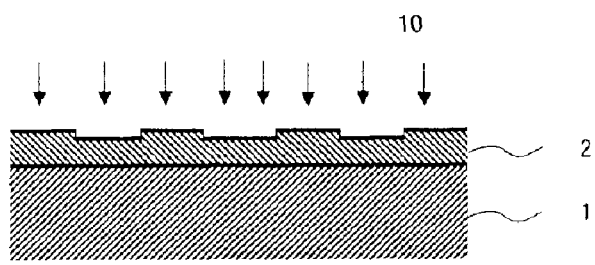
Figure 3:
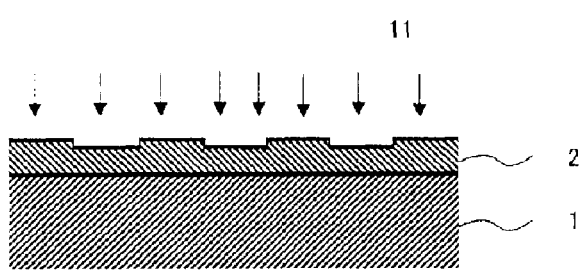
Figure 3:
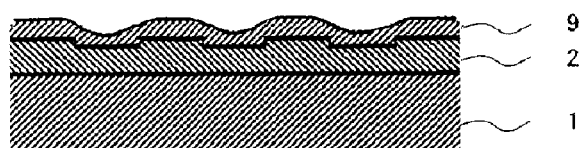
Figure 4:
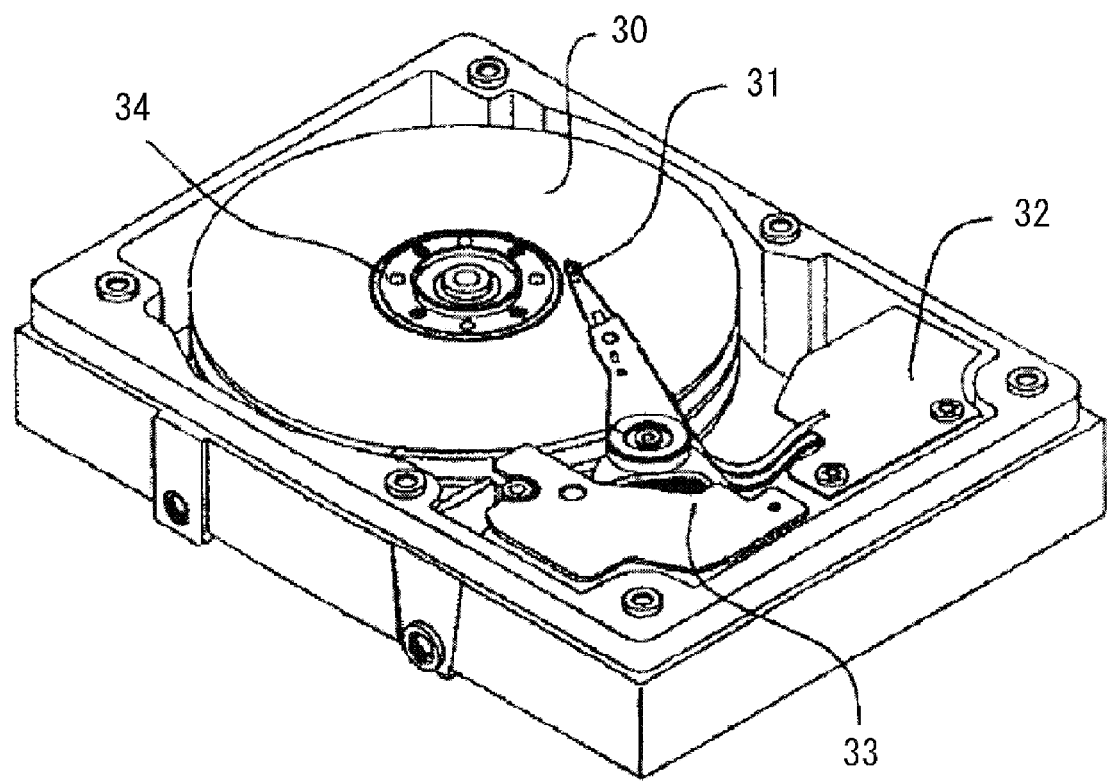
FIG. 4 is a schematic illustration of the magnetic recording-reproducing apparatus according to the present invention.

In FIG. 1,
100 Magnetic recording region (elevation)
200 Boundary region (depression)
300 Protective carbon overcoat
400 Difference in height between elevation and depression
500 Thickness of portions of carbon overcoat located on magnetic recording regions
600 Thickness of portions of carbon overcoat located on boundary regions
700 Difference in height between upper surface of portions of carbon overcoat located on magnetic recording regions and upper surface of portions of carbon overcoat located on boundary regions In FIG. 2 and FIG. 3,
1 Non-magnetic substrate
2 Magnetic layer
3 Mask layer 4 Resist layer
5 Stamp
6 Milling ion
7 Region from which surface layer portion of magnetic layer has been partially removed
d Depth in region from which surface layer portion of magnetic layer has been partially removed, i.e., thickness of removed surface layer portion of magnetic layer.
8 Depression in resist layer, formed by pressing
9 Protective overcoat
10 Reactive plasma or reactive ion
11 Inert gas
In FIG. 4,
30 Magnetic recording medium
31 Magnetic head
32 Recording-reproducing signal system
33 Head-driving part
34 Medium-driving part Best Mode for Carrying Out the Invention The magnetic recording medium according to the present invention comprises a magnetic layer having a magnetic recording pattern comprising elevations constituting magnetic recording regions and depressions constituting boundary regions for partitioning the magnetic recording regions, and a continuous protective carbon overcoat on the magnetic layer, and characterized in that portions of the carbon overcoat located on the magnetic recording regions-constituting elevations of the magnetic layer are thicker than portions of the carbon overcoat located on the boundary regions-constituting depressions of the magnetic layer.

The above-mentioned boundary regions in the magnetic layer preferably have modified magnetic characteristics. More specifically, the boundary regions are preferably non-magnetized or magnetization-reduced regions.

As illustrated in FIG. 1(a), in the magnetic recording medium according to the present invention, the patterned magnetic layer has elevations 100 constituting magnetic recording regions and depressions 200 constituting boundary regions for partitioning the magnetic recording regions. The elevations and the depressions are formed by a procedure of slightly etching, for example, by ion-milling, or ion-irradiating or ion-implanting the surface in regions of the continuous magnetic layer to be formed into the boundary regions.

In the case when a protective carbon overcoat 300 is formed on the magnetic layer with the elevations and the depressions, for example, by a PVD (physical vapor deposition) method, the resulting carbon overcoat has an approximately uniform thickness over the elevations and the depressions as illustrated in FIG. 1(a). Thus, the difference in height between the upper surface of the portions of carbon overcoat located on the elevations of magnetic layer and the upper surface of the portions of carbon overcoat located on the depressions of magnetic layer (i.e., the depth of the portions of carbon overcoat on the depressions 200) is approximately the same as the difference in height between the elevations and depressions of the underneath magnetic layer.

If a protective carbon overcoat 300 is formed on the magnetic layer with the elevations and the depressions by the conventional CVD method, the resulting carbon overcoat has an uneven thickness due to the behavior of the CVD method. That is, the portions of the carbon overcoat on the depressions formed by, for example, ion implantation, are thicker than the portions of the carbon overcoat on the elevations for which ion-implantation has not been conducted, as illustrated in FIG. 1(b). It is presumed that the regions for which ion-implantation has been conducted have a roughened surface (i.e., minute protrusions and depressions are formed on the surface thereof), and the roughened surface exhibits enhanced adhesion to a reactive radical, and carbon nucleuses are preferentially produced on the roughened surface in said regions. Consequently, the portions of the carbon overcoat on the ion-implanted regions are thicker than the portions of the carbon overcoat on the non-etched regions. This behavior of forming a carbon overcoat with an uneven thickness is preferable for providing a magnetic recording medium having a smooth and flat surface.

However, the researches made by the present inventor revealed that, when the portions of protective carbon overcoat on the magnetic recording regions are thinner than the portions of protective carbon overcoat on the boundary regions, especially non-magnetized or magnetization-reduced boundary regions, or boundary regions comprised of an oxide, corrosion of the magnetic layer tends to occur at an enhanced rate in the magnetic recording regions. It is presumed that this corrosion occurs for the following reasons. First, the protective carbon overcoat is thin in the portions on the magnetic recording regions. Second, there is a difference in thickness between the portions of the protective carbon overcoat on the magnetic recording regions and the portions thereof on the boundary regions. Thus, when the carbon overcoat has an uneven thickness and is thin in the portions of carbon overcoat on an easily corrosive magnetic material, the corrosion of the magnetic material proceeds at an enhanced rate.

As illustrated in FIG. 1(c) which shows a cross section vertical to the major surface of the magnetic recording medium according to the present invention, the magnetic layer has a magnetic recording pattern with elevations 100 constituting the magnetic recording regions and depressions 200 constituting the boundary regions. The protective carbon overcoat formed on the magnetic layer is characterized as having thick portions 500 located on the magnetic recording regions-constituting elevations 100 of magnetic layer and thin portions 600 located on the boundary regions-constituting depressions 200 of magnetic layer.

The difference 400 in height between the magnetic recording regions-constituting elevations 100 of the magnetic layer and the boundary regions-constituting depressions 200 of the magnetic layer is preferably within the range of 0.1 nm to 9 nm.

The difference in height 700 between the upper surface of the thick portions of carbon overcoat located on the elevations 100 of magnetic layer and the upper surface of the thin portions of carbon overcoat located on the depressions 200 of magnetic layer is preferably within the range of 1 nm to 10 nm. The thick portions of carbon overcoat located on the elevations of magnetic layer preferably have a thickness in the range of 1 nm to 5 nm. The thin boundary regions constituted by the depressions of magnetic layer preferably have a thickness in the range of 0.1 nm to 4 nm.

When the protective carbon overcoat in the magnetic recording medium has the above-mentioned feature of thickness, the corrosion resistance of the magnetic recording regions in a magnetic layer is enhanced, and the magnetic recording medium exhibits improved environmental resistance, especially enhanced corrosion resistance under high-temperature and high-humidity conditions. The magnetic recording medium has a high magnetic recording density, and its hard disk drive exhibits improved floatability of magnetic head, and the magnetic recording medium exhibits excellent electromagnetic conversion characteristics.

If the portions of carbon overcoat on the magnetic recording regions-constituting elevations of magnetic layer have the same thickness as that of the portions of carbon overcoat on the boundary regions-constituting depressions of magnetic layer, even when the production conditions of a magnetic recording medium are varied only to a slight extent, the thicknesses of the carbon overcoats are often not uniform and the magnetic recording mediums tend to exhibit different environmental resistances.

In the magnetic recording medium according to the present invention, the boundary regions constituted by the depressions in the magnetic layer are preferably comprised of a non-magnetic material, especially a non-magnetic material comprised of an oxide. The oxide can be produced, for example, by exposing a magnetic material to oxidative reactive plasma.

When the portions of carbon overcoat on the magnetic recording regions-constituting elevations of magnetic layer are thicker than that of the portions of carbon overcoat on the boundary regions-constituting depressions of magnetic layer, as in the magnetic recording medium of the present invention, it is possible that the boundary regions are corroded. However, when the boundary regions are comprised of a non-magnetic material, especially non-magnetic material comprised of an oxide, the boundary regions are not corroded or corroded only to a very slight extent. The non-magnetic oxide is in capable of being oxidized any more, and the corrosion does not occur.

The method for producing the magnetic recording medium according to the present invention comprises the steps of forming a magnetic layer having a magnetic recording pattern comprising elevations constituting magnetic recording regions and depressions constituting boundary regions for partitioning the magnetic recording regions; and forming a continuous protective carbon overcoat on the magnetic layer having magnetic recording regions-constituting elevations and boundary regions-forming depressions; and is characterized in that the formation of the continuous carbon overcoat is carried out by a CVD method in a manner such that portions of the carbon overcoat located on the magnetic recording regions-constituting elevations of the magnetic layer are thicker than portions of the carbon overcoat located on the boundary regions-constituting depressions of the magnetic layer.

In the above-mentioned method, a procedure is preferably adopted wherein regions in a continuous magnetic layer to be formed into the boundary regions are subjected to ion-milling to form a magnetic recording pattern comprising the magnetic recording regions-constituting elevations and the boundary regions-constituting depressions, and then, the continuous protective carbon overcoat is formed on the magnetic layer.

In the above-mentioned procedure, it is preferable that, after the step of formation of the magnetic layer having a magnetic recording pattern comprising the magnetic recording regions-constituting elevations and the boundary regions-constituting depressions by ion-milling the regions in a continuous magnetic layer, but prior to the step of formation of the protective carbon overcoat, a step of modifying the magnetic characteristics of the boundary regions is carried out by exposing the ion-milled boundary regions to a reactive plasma or a reactive ion, or by conducting ion-implantation in the ion-milled boundary regions.

More specifically, the magnetic recording medium according to the present invention can be produced by a method comprising the following steps (a) through (f) which are carried out in this order:

(a) forming a continuous magnetic layer on a surface of a non-magnetic substrate;

(b) forming a mask layer for forming a magnetic recording pattern on the magnetic layer;

(c) subjecting the mask layer to patterning;

(d) subjecting, to ion-milling, regions to be formed into boundary regions for partitioning magnetic recording regions in the magnetic layer, while the mask layer remains on the regions to be formed into the magnetic recording regions, whereby elevations constituting the magnetic recording regions and depressions constituting the boundary regions are formed in the magnetic layer;

(e) removing the mask layer; and then, (f) forming by a CVD method a continuous protective carbon overcoat on the magnetic layer, in a manner such that portions of the carbon overcoat located on the magnetic recording regions-constituting elevations of magnetic layer are thicker than portions of the carbon overcoat located on the boundary regions-constituting depressions of magnetic layer.

In a preferred embodiment, the above-mentioned method for producing the magnetic recording medium further comprises a step of modifying the magnetic characteristics of the boundary regions of magnetic layer, after the ion-milling step (d) but prior to the mask-removing step (e), wherein the ion-milled boundary regions are exposed to a reactive plasma or a reactive ion, or ion-implantation is carried out in the ion-milled boundary regions.

The continuous protective carbon overcoat such that portions of the carbon overcoat located on the magnetic recording regions-constituting elevations of magnetic layer are thicker than portions of the carbon overcoat located on the boundary regions-constituting depressions of magnetic layer can be formed in the above-mentioned protective carbon overcoat-forming step (f) by adopting a procedure selected from the following procedures [1], [2] and [3]. In these procedures, the formation of the carbon overcoat is carried out by a CVD method.

[1] a procedure of forming the protective carbon overcoat by a CVD method while a bias voltage is imposed to the substrate in the protective carbon overcoat-forming step (f). By imposing a bias voltage to the substrate, a plasma can easily be concentrated to the magnetic regions-constituting elevations of magnetic layer. Consequently the radical density in the elevations is enhanced and a thick protective carbon overcoat is formed on the elevations.

[2] a procedure of, after the mask layer-removing step (e) but prior to the formation of the protective carbon overcoat in the step (f), conducting ion-implantation in the magnetic recording regions and the boundary regions in the magnetic layer, followed by formation of a protective carbon overcoat by a CVD method.

In this procedure [2], ion-implantation is conducted in both of the magnetic recording regions and the boundary regions in the magnetic layer, therefore, radical is adhered to both regions at substantially the same rate. Consequently, when a protective carbon overcoat is formed by a CVD method, a uniform plasma is produced within a chamber, but, the plasma is nearer to the magnetic regions-constituting elevations than to the boundary regions-constituting depressions. Therefore, the rate of formation of carbon overcoat on the elevations is higher than that on the depressions.

[3] a procedure of conducting ion-implantation in the magnetic recording regions of magnetic layer while a mask remains on the boundary regions of magnetic layer, after the ion-milling step (d) for forming the magnetic regions-constituting elevations and the boundary regions-constituting depressions, and the succeeding mask layer-removing step (e), but prior to the formation of the protective carbon overcoat in the step (f), whereby the magnetic recording regions are roughened. By this procedure [3], the surface of the magnetic recording regions becomes more rough than the surface of the boundary regions. Therefore, radical is adhered to the magnetic recording regions at an enhanced rate, and the rate of formation of carbon overcoat on the elevations is higher than that on the depressions.

The method for producing a magnetic recording medium according to the present invention will be described in detail and step by step in the production process with reference to FIG. 2 and FIG. 3, which illustrate a flow-sheet of the first-half steps and a flow-sheet of the second-half steps, respectively, in the method for producing the magnetic recording medium of the present invention.

A typical example of the magnetic recording medium of the present invention has a multilayer structure comprising, for example, a non-magnetic substrate, a soft magnetic underlayer formed on the substrate, an intermediate layer formed on the soft magnetic underlayer, a magnetic layer having a magnetic pattern, a protective carbon overcoat formed on the magnetic layer, and an uppermost lubricant layer. However, layers other than the non-magnetic substrate, the magnetic layer and the protective carbon overcoat are not essential but optional in the magnetic recording medium of the present invention. Therefore, the layers other than the non-magnetic substrate 1, the magnetic layer 2 and the protective carbon overcoat 9 are not illustrated in FIG. 2 and FIG. 3.

The non-magnetic substrate 1 used in the present invention is not particularly limited, and, as specific examples thereof, there can be mentioned aluminum alloy substrates predominantly comprised of aluminum such as, for example, an Al—Mg alloy substrate; and substrates made of ordinary soda glass, aluminosilicate glass, glass ceramics, silicon, titanium, ceramics, and organic resins. Of these, aluminum alloy substrates, glass substrates such as glass ceramics substrate, and silicon substrate are preferably used.

The non-magnetic substrate preferably has an average surface roughness (Ra) of not larger than 1 nm, more preferably not larger than 0.5 nm, and especially preferably not larger than 0.1 nm.

The magnetic layer 2 formed on a surface of the above-mentioned non-magnetic substrate preferably comprises an oxide in an amount of 0.5 atomic % to 6 atomic %.

The magnetic layer preferably comprises an alloy predominantly comprised of cobalt. As specific examples of the alloy, there can be mentioned cobalt alloys combined with an oxide, such as CoCr, CoCrPt, CoCrPtB, CoCrPtB—X or CoCrPtB—X—Y (X represents an element such as Ru and W, and Y represents an element such as Cu and Mg), which have been combined with an oxide; and oxygen- or oxide-containing cobalt alloys, such as CoCrPt—O, CoCrPt—$SiO_2$, CoCrPt—$Cr_2O_3$, CoCrPt—$TiO_2$, CoCrPt—$ZrO_2$, CoCrPt—$Nb_2O_5$, CoCrPt—$Ta_2O_5$, CoCrPt—$Al_2O_3$, CoCrPt—$B_2O_3$, CoCrPt—$WO_2$ and CoCrPt—$WO_3$.

The magnetic layer usually has a thickness in the range of 3 nm to 20 nm, preferably 5 nm to 15 nm. The magnetic layer is formed so that sufficiently high input and output head powers can be obtained in consideration of the kind of magnetic alloy and the laminar structure. The magnetic layer should have a thickness of at least certain value so as to obtain an output power of at least certain level at reproduction. However, parameters relating to the recording/reproducing characteristics are generally deteriorated with an increase of the output power. Therefore an optimum thickness of magnetic layer is preferably chosen in consideration of the output power and the recordation-reproduction characteristics.

The magnetic layer is usually formed as a thin film by a sputtering method.

The process for producing the magnetic recording medium according to the present invention will be more specifically described.

As illustrated in FIG. 2, the method for producing the magnetic recording medium comprises the following steps.

Step A of forming at least a magnetic layer 2 on a non-magnetic substrate 1.

Step B of forming a mask layer 3 on the magnetic layer 2.

Step C of forming a resist layer 4 on the mask layer 3.

Step D of transferring a negative magnetic recording pattern onto the resist layer 4 by pressing a stamp 5 against the resist layer 4. The negative magnetic recording pattern refers to a negative pattern having depressions formed on the resist layer, which depressions have been formed in the regions for separating recording tracks formed on the magnetic layer. The arrow in step D in FIG. 2 refers to the direction in which the stamp 5 moves. Reference numeral 8 represents a depression in the resist layer 4, which is formed by pressing.

Step E of selectively removing the residual portions of the mask layer 3 and the residual portions of the resist layer 4, which portions form depressions corresponding to the negative pattern of the magnetic recording pattern as illustrated in step D.

As illustrated in FIG. 3, the method for producing the magnetic recording medium comprises the following steps.

Step F of exposing to milling ion 6 the exposed depressions of the surface layer of magnetic layer 2, corresponding to the regions from which the resist layer 4 and the mask layer 3 have been removed, thereby removing the surface layer portions in the ion-milled regions of magnetic layer. Reference numeral 7 indicates the ion-milled regions of the surface layer of magnetic layer, and reference letter d indicates the thickness of the surface layer portions of magnetic layer which have been removed by ion-milling.

By the ion-milling, elevations constituting the magnetic recording regions of magnetic layer 2 and depressions constituting the boundary regions are formed.

Step of exposing the ion-milled regions 7 of the magnetic layer, from which the surface layer portions of magnetic layer have been removed, to a reactive plasma or a reactive ion, or ion-implanting the ion-milled regions 7, thereby modifying the magnetic characteristics of the regions 7 of magnetic layer or reducing magnetization in said regions 7 of magnetic layer. This step of magnetic characteristics-modification or magnetization-reduction is not shown in FIG. 3. The depth of the ion-milled regions 7 is slightly increased due to etching by conducting this step of magnetic characteristics-modification or magnetization-reduction.

The above-mentioned step F of ion-milling 6 to remove the surface layer portions of magnetic layer is not essential, but is preferably carried out. That is, even though the ion-milling step F is not carried out, the depressions constituting the boundary regions for partitioning the magnetic recording regions can be formed by exposing the exposed surface of magnetic layer, from which the resist layer 4 and the mask layer 3 have been removed, to a reactive plasma or a reactive ion, or ion-implanting in said exposed surface of magnetic layer. Therefore, the ion-milling step F of ion-milling 6 to remove the surface layer portions of magnetic layer can be omitted. Instead, it is possible that the ion-milling step F of ion-milling 6 is conducted to remove the surface layer portions of magnetic layer and form the depressions to be formed into the boundary regions, and the step of exposing the ion-milled regions 7 of magnetic layer to a reactive plasma or a reactive ion, or ion-implanting the ion-milled regions 7.

After the above-mentioned ion-milling step F to remove the surface layer portions of magnetic layer, and/or the above-mentioned step of exposing the regions of magnetic layer to a reactive plasma or a reactive ion, or ion-implanting the regions of magnetic layer, step G of removing the residual resist layer 4 and the residual mask layer 3 is carried out.

The production process comprises preferably an optional step H of, after the step G, irradiating the exposed surface of the magnetic layer with an inert gas 11. Thereafter, a protective carbon overcoat is formed on the surface of the magnetic layer.

The mask layer 3, formed on the magnetic layer 2 in step B in the process for producing the magnetic recording medium, can be formed from at least one material selected from Ta, W, Ta nitride, W nitride, Si, $SiO_2$, $Ta_2O_5$, Re, Mo, Ti, V, Nb, Sn, Ga, Ge, As and Ni. By using these materials, the shieldability of the mask layer 3 against milling ion 6 can be enhanced and the formability of the magnetic recording pattern by the mask layer 3 can also be enhanced. These materials can easily be removed at dry etching step using a reactive gas, and therefore, in step H shown in FIG. 3, residual mask layer can be minimized and staining of the exposed surface of magnetic recording medium layer can be avoided or minimized.

Among the above-listed materials for the mask layer 3, Mo, Ta, W, Ni, Ti, V, Nb, As, Ge, Sn and Ga are preferably used. Mo, Ta, W, Ni, Ti, V and Nb are especially preferable. Mo, Ta and W are most preferable.

The mask layer 3 preferably has a thickness in the range of 1 nm to 20 nm.

After a negative pattern of the magnetic recording pattern is transferred onto the resist layer 4 in step D shown in FIG. 2, the depressed regions 8 of resist layer 4 preferably have a thickness in the range of 0 to 10 nm. When the depressed regions 8 of resist layer have such thickness, the selective removal of the mask layer 3 in step E in FIG. 2 can be effected in an advantageous manner. That is, undesirable sagging at edge portions of the mask layer 3 can be avoided and the shieldability of the mask layer 3 against milling ion 6 can be enhanced in step F in FIG. 3, and the formability of the magnetic recording pattern by the mask layer 3 also is enhanced. The resist layer preferably has a thickness in the range of approximately 10 nm to 100 nm.

In a preferred embodiment of the production method, a material which can be cured upon irradiation with radiation is used as the material for forming the resist layer 4 in step C in FIG. 2; and, when a negative magnetic recording pattern is transferred onto the resist layer 4 by using a stamp 5 in step D, or after the transfer of negative magnetic recording pattern has been completed, the resist layer 4 is irradiated with radiation to be cured. In this preferred embodiment, the configuration of stamp 5 can be transferred on the resist layer 4 with high precision. Consequently, when the regions of the mask layer 3, corresponding to the negative pattern of the magnetic recording pattern, are removed by etching in step E in FIG. 2, undesirable sagging at edge portions of the mask layer 3 can be avoided and the shieldability of the mask layer 3 against implanted ion can be enhanced, and the formability of the magnetic recording pattern by the mask layer 3 can also be enhanced.

The radiation used for curing the curable material refers to electromagnetic waves in a broad sense which include heat rays, visible light, ultraviolet light, X rays and gamma rays. As specific examples of the curable material, there can be mentioned thermosetting resins which are curable by heat rays, and ultraviolet-setting resins which are curable by ultraviolet light.

In the step D of transferring a negative magnetic recording pattern onto the resist layer 4 by using a stamp 5, it is preferable that the stamp 5 is pressed on the resist layer 4 having high fluidity, and, while the resist layer is in a pressed state, the resist layer 4 is irradiated with radiation to be thereby cured, and thereafter the stamp 5 is removed from the resist layer 4. By this procedure, the configuration of the stamp 5 can be transferred to the resist layer 4 with a high precision.

For irradiating the resist layer having high fluidity with radiation while the resist layer is in a pressed state, there can be adopted a method of irradiating a multi-layer structure comprising the resist layer with radiation by exposing the substrate side (i.e., the side opposite to the stamp-pressed resist layer) of the multi-layer structure to the radiation; a method of using a radiation-transmitting stamp, and exposing the stamp-pressed side of the multi-layer structure to radiation; a method of exposing the stamp-pressed resist layer to radiation by applying radiation from the side of the multi-layer structure; and a method of exposing the stamp-pressed side of the multi-layer structure or the opposite side (substrate side) thereof, with radiation exhibiting a high conductivity to a solid, such as heat rays.

In a preferred specific example of the procedure of irradiating the radiation-curable resist layer with radiation to cure the resist layer, an ultraviolet ray-curable resin such as novolak resin, an acrylic acid ester resin or an alicyclic epoxy resin is used as the radiation-curable resist resin, and a stamp made of a highly ultraviolet ray-transmitting glass or resin is used.

By adopting the above-mentioned procedures, the magnetic characteristics such as, for example, the coercive force and the residual magnetization in the boundary regions for partitioning the magnetic recording regions in a magnetic recording pattern can be modified or reduced to the minimum values, and consequently, the letter bleeding at writing can be avoided and the areal recording density of the magnetic recording medium can be enhanced to a greater extent.

The stamp used in the pattern-transferring step D is preferably made by forming minute track patterns on a metal plate, for example, by electron beam lithography. The material used for forming the stamp is not particularly limited, provided that the purpose of the invention is not impaired, but, a material having a hardness sufficient for enduring over the process for producing the magnetic recoding medium, and having good durability, is preferably used. Such material includes, for example, nickel.

The patterns formed on the stamp include those which are conventionally used tracks for recording ordinary data, and further include patterns for servo signal, such as burst patterns, gray code patterns and preamble patterns.

As illustrated in step F in FIG. 3, the surface layer portions in the depression regions of the magnetic layer are preferably removed by, for example, ion-milling, and thereafter, the newly exposed regions are exposed to a reactive plasma or a reactive ion, whereby the magnetic characteristics of said depressed regions of magnetic layer are modified. The magnetic recording medium having such depressed regions having modified magnetic characteristics has magnetic recording patterns exhibiting clear contrast and has a high SNR, as compared with those of the conventional magnetic recording medium having regions which have modified magnetic characteristics, but which have been prepared by a method wherein the surface layer portions in the depression regions of magnetic layer are not removed. This would be for the following reasons. First, by the removal of the surface layer portions in the depressed regions of magnetic layer, the newly exposed regions become clearer and more activated, therefore, exhibit enhanced reactivity with a reactive plasma and a reactive ion; and secondly, surface defects such as minute voids are introduced in the newly exposed regions into which a reactive ion can easily be penetrated.

The thickness, as expressed by "d" in step F in FIG. 3, of the surface layer portions of magnetic layer which are removed by, for example, ion-milling 6, is preferably in the range of 0.1 nm to 5 nm. When the thickness of the removed surface layer portions is smaller than 0.1 nm, the above-mentioned benefits brought about by the removal of said surface layer portions are insufficient. In contrast, when the thickness of the removed portions is larger than 5 nm, the resulting magnetic recording medium has a poor surface smoothness. This is because the surface layer portions-removed depressions are further etched when the depressions are exposed to a reactive plasma, they are further etched. The resulting magnetic recording-reproducing apparatus has a poor head-floating property.

In the present invention, the boundary regions of the magnetic layer, which magnetically partition, for example, the magnetic recording tracks and servo signal patterns from each other are preferably formed by the exposure to a reactive plasma or a reactive ion whereby the magnetic characteristics of said regions of magnetic layer are modified or degraded.

By the exposure to a reactive plasma or a reactive ion, the depressions of magnetic layer are further etched. Therefore when both of the ion-milling step F and the step of exposing to a reactive plasma or a reactive ion are carried out, the depth in the depressions is the total depth achieved by the two steps. The total depth is preferably in the range of 0.1 nm to 9 nm.

By the term "magnetically partitioned magnetic recording pattern" as used in the present specification is meant a magnetic recording pattern in the magnetic layer in which magnetic recording regions are partitioned by the magnetic characteristics-modified or magnetization-reduced boundary regions (depressions) as viewed when the multi-layer structure is viewed from the front side. The object of the present invention can be achieved even in an embodiment wherein, in the case when the magnetic layer is partitioned by the magnetic characteristics-modified or magnetization-reduced boundary regions thereof in the upper surface portion of the magnetic layer, even though the magnetic layer is not partitioned in the lowermost portion thereof. Therefore this embodiment also falls within the scope of the magnetically partitioned magnetic recording pattern as herein used.

By the term "magnetic recording pattern" as used herein is meant a magnetic recording pattern in a broad sense which include patterned media wherein magnetic recording patterns are arranged with a certain regularity per bit; media wherein magnetic recording patterns are arranged in tracks fashion; and servo signal patterns.

The present invention is preferably a discrete type magnetic recoding medium in view of simplicity and ease in the method of production, wherein the magnetically partitioned magnetic recording pattern involves magnetic recoding tracks and servo signal patterns.

The modification in the boundary regions of the magnetic layer as conducted for forming the magnetic recording pattern in the present invention refers to at least partially changing the magnetic characteristics, more specifically, lowering the coercive force or the residual magnetization, as well as demagnetization of magnetic layer in the boundary regions thereof for the formation of magnetic recording pattern.

The above-mentioned boundary regions of the magnetic layer, which magnetically partition, for example, the magnetic recording tracks and servo signal patterns from each other, can be formed by amorphization of the specific regions by exposure to a reactive plasma or a reactive ion.

Further, the magnetic characteristics of the boundary regions of magnetic layer can be modified also by changing the crystalline structure of the magnetic layer.

The amorphization of the magnetic layer in the present invention refers to that the atomic arrangement in the magnetic layer is changed to an irregular atomic arrangement with no long-distance order. More specifically it refers to that microcrystalline particles having a size of smaller than 2 nm are arranged in random. This arrangement in random of the microcrystalline particles can be confirmed by the absence of peaks attributed to the crystalline plane or by the presence of halo alone by X-ray diffraction analysis or electron-ray diffraction analysis.

The reactive plasma as used in the present invention includes, for example, inductively coupled plasma (ICP) and reactive ion plasma (RIE). The reactive ion as used in the present invention includes, for example, reactive ions present in the above-mentioned inductively coupled plasma and reactive ion plasma.

The inductively coupled plasma as used herein refers to a high-temperature plasma which is obtained by imposing a high voltage to a gas thereby forming a plasma, and further applying magnetic variation at a high frequency to generate joule heat due to over-current inside the plasma. The inductive coupled plasma has a high electron density, and, can modify the magnetic characteristics of magnetic layer with a high efficiency in a magnetic film with a broad-area, as compared with the case of making discrete track media conventionally using an ion beam.

The reactive ion plasma as used herein refers to a highly reactive plasma which is obtained by incorporating a reactive gas such as $O_2$, $SF_6$, $CHF_3$, $CF_4$ or $CCl_4$ into a plasma. When such reactive ion plasma having incorporated therein a reactive gas is used as the reactive plasma in the method of the present invention, said plasma can modify the magnetic characteristics of the magnetic layer with a higher efficiency.

The reactive plasma or the reactive ion preferably contains a halogen. As the halogen ion, especially preferable is a halogen ion produced by introducing at least one gaseous halide selected from the group consisting of $CF_4$, $SF_6$, $CHF_3$, $CCl_4$ and KBr into the reactive plasma or the reactive ion.

By the presence of a halogen in the reactive plasma or the reactive ion the reactivity of the magnetic layer with a plasma for the modification of the depressed regions of the magnetic layer is enhanced and the image of the resulting magnetic recording pattern becomes more sharp. The reason for which is not clear, but it is presumed that the halogen ion in the reactive plasma etches foreign matter deposited on the surface of the magnetic layer to make clean the surface of the magnetic layer with the result of enhancement of the reactivity of the magnetic layer. Further the cleaned surface of the magnetic layer is presumed to react the halogen ion with a high efficiency.

The modification of the magnetic layer is achieved by exposure to the reactive plasma or the reactive ion in the present invention. This modification is preferably effected by the reaction of magnetic metal constituting the magnetic layer with atoms or ions present in the reactive plasma or the reactive ion. This reaction involves invasion of atoms or ions into the magnetic metal and causing, for example, change of the crystalline structure of magnetic metal, change of the composition of magnetic metal, oxidation of magnetic metal, nitriding of the magnetic metal, and/or silicification of magnetic metal.

After the above-mentioned ion-milling step F to remove the surface layer portions of magnetic layer, and/or the above-mentioned step of exposing the regions of magnetic layer to a reactive plasma or a reactive ion, or ion-implanting the regions of magnetic layer, step G of removing the residual resist layer 4 and the residual mask layer 3 is carried out. This step G can be carried out by, for example, a procedure of dry etching, reactive ion etching, ion milling or wet etching.

After the removal of the resist layer 4 and the masking layer 3, the magnetic layer having been activated in the steps F and G in FIG. 3 is exposed to an inert gas irradiation 11 in the step H, whereby the magnetic layer is stabilized, and occurrence of the migration of magnetic grains under high-temperature and high-humidity conditions can be prevented or minimized. The reason for which such benefits are obtained by the exposure to an inert gas irradiation is not clear. But, it is presumed that the inert element intrudes into the surface layer portion of the magnetic layer and consequently the migration of magnetic grains can be suppressed, and further that the surface layer portions activated by inert gas irradiation is removed and the migration of magnetic grains does not occur or occurs only to a minor extent.

As the inert gas 11, at least one gas selected from the group consisting of Ar, He and Xe is preferably used in view of the stability and the enhanced effect of suppressing the migration of magnetic grains.

The exposure to the inert gas irradiation is carried out preferably by a method using at least one means selected from the group consisting of ion gun, induced coupled plasma (ICP), and reactive ion plasma (RIE). Of these, ICP and RIE are preferable in view of enhanced intensity of irradiation. The procedures for ICE and the RIE are hereinbefore described.

A protective carbon overcoat 9 is formed in the method of the present invention as illustrated in step I in FIG. 3, and then a lubricant (not shown in FIG. 3) is preferably coated on the protective overcoat to complete the magnetic recording medium.

The formation of the protective carbon overcoat 9 can be effected by the method hereinbefore mentioned, but, a diamond-like-carbon film is especially preferably formed using a CVD method.

The CVD method and a CVD apparatus are well known. The protective carbon overcoat such that portions of the carbon overcoat located on the magnetic recording regions-constituting elevations of the magnetic layer are thicker than portions of the carbon overcoat located on the boundary regions-constituting depressions of the magnetic layer is preferably carried by the following procedures using a CVD method.

A CVD film-forming apparatus constituting the major part of an apparatus used in one embodiment for the production of a magnetic recording medium of the present invention is provided with a chamber in which disks are placed; electrodes placed in confrontation with each other on both side walls within the chamber; a high frequency electric source for supplying a high frequency current to the electrode; a bias electric source connected to the disks in the chamber; and a supply source of a reactive gas as a material for a protective carbon overcoat to be formed on the disks.

The chamber is connected to an inlet pipe for supplying a reactive gas and an exhaust pipe for drawing out an exhaust gas. The exhaust pipe is provided with a exhaust gas-controlling valve whereby the amount of exhaust gas is controlled so as to maintain the inner pressure within the chamber at a desired level.

As the high frequency electric source, those which are capable of supplying power of 50 to 2000 W to the electrodes at the formation of the protective carbon overcoat are preferably used.

As the bias electric source, a high frequency electric source or a pulse direct current electric source is preferably used for concentrating a plasma to the magnetic regions-constituting elevations of a magnetic recording pattern, enhancing the radical density in said elevations, and enhancing the rate of film-formation on said elevations. The high frequency electric source is preferably capable of imposing a high frequency power of 10 to 300 W to the disks. The pulse direct current electric source is preferably capable of imposing a voltage (average voltage) of −400V to 10V to the disks at a pulse width of 10 to 50000 ns and a frequency of 10 kHz to 1 GHz.

A lubricating layer is preferably formed on the protective carbon overcoat. The lubricating layer is formed from, for example, a fluorine-containing lubricant, a hydrocarbon lubricant or a mixture thereof. The thickness of the lubricating layer is usually in the range of 1 to 4 nm.

The constitution of an example of the magnetic recording-reproducing apparatus according to the present invention is illustrated in FIG. 4. The magnetic recording-reproducing apparatus of the present invention comprises, in combination, the above-mentioned magnetic recording medium 30 of the present invention; a driving part 34 for driving the magnetic recording medium in the recording direction; a magnetic head 31 comprising a recording part and a reproducing part; a head-driving part 33 for moving the magnetic head 31 in a relative motion to the magnetic recording medium 30; and a recording-and-reproducing signal treating means 32 for inputting signal into the magnetic head 31 and for reproduction of output signal from the magnetic head 31.

The magnetic recording-reproducing apparatus comprising the combination of the above-mentioned means can provide a high recording density. More specifically, in the magnetic recording medium of the magnetic recording-reproducing apparatus, the magnetic recording tracks are magnetically discrete, and therefore, the recording head width and the reproducing head width can be approximately the same size as each other with the result of sufficiently high reproducing output power and high SNR. This is in a striking contrast to the conventional magnetic recording medium wherein the reproducing head width must be smaller than the recording head width to minimize the influence of the magnetization transition regions in the track edges.

By constituting the reproducing part of the magnetic head as GMR head or TMR head, a sufficiently high signal intensity can be obtained even at a high recording density, thus, the magnetic recording apparatus having a high recording density can be provided.

When the head is floated at a floating height in the range of 0.005 μm to 0.020 μm, which is lower than the conventionally adopted floating height, the output power is increased and the SNR becomes large, and thus the magnetic recording apparatus can have a large size and a high reliability.

If a signal treating circuit using a sum-product composite algorithm is combined in the magnetic recording medium, the recording density can be much more enhanced, and a sufficiently high SNR can be obtained even when recordation-reproduction is carried out at a track density of 100 k-tracks or more per inch, or a linear recording density of 1,000 k-bit or more per inch, or a high recording density of at least 100 G-bit or more per square inch.

EXAMPLES

The invention will now be described more specifically by the following examples and comparative examples.

Examples 1 to 7

A glass substrate for HD was placed in a vacuum chamber and the chamber was vacuumed to a pressure of not higher than $1.0 \times 10^{-5}$ Pa to remove the air. The glass substrate used was comprised of glass ceramics having a composition of $Li_2Si_2O_5$, $Al_2O_3$—$K_2O$, $MgO$—$P_2O_5$ and $Sb_2O_3$—$ZuO$, and has an outer diameter of 65 mm and an inner diameter of 20 mm, and an average surface roughness (Ra) of 2 angstroms.

On the glass substrate, a soft magnetic underlayer composed of 65Fe-30Co-5B, an intermediate layer composed of Ru and a perpendicularly orientated magnetic layer having a granular structure comprised of a Co-10Cr-20Pt-8 ($SiO_2$) alloy (the numerals immediately before the elements indicate percents by mole of the elements) were formed in this order by a DC sputtering method. The FeCoB soft magnetic underlayer, the Ru intermediate layer and the magnetic layer had a thickness of 600 angstroms, 100 angstroms and 150 angstroms, respectively.

Then a tantalum (Ta) mask layer having a thickness of 60 nm was formed on the magnetic layer by a sputter method. A resist layer was formed on the tantalum mask layer by a spin-coating method. The resist layer was comprised of an ultraviolet ray-curable novolak resin, and had a thickness of 100 nm.

A glass stamp having a negative pattern corresponding to the desired magnetic recording pattern was pressed onto the resist layer at a pressure of 1 MPa (about 8.8 kgf/cm$^2$). The glass stamp had an ultraviolet ray (wavelength: 250 nm) transmission of at least 95%. While the stamp was pressed onto the resist layer, the upper surface of the stamp was irradiated with ultraviolet ray having a wavelength of 250 nm for 10 seconds to cure the resist layer. Thereafter the stamp was separated from the resist layer thereby transferring a magnetic recording pattern on the resist layer. The thus-transferred magnetic recording pattern had a configuration such that the elevations in the resist layer are circular with a width of 120 nm, and the depressions in the resist layer are circular with a width of 60 nm. The thickness of the patterned resist layer was 80 nm and the thickness of the depressed portions of the resist layer was about 5 nm. The depressed portions had an angle of about 90 degrees to the substrate surface.

The depressed portions of the resist layer and the corresponding portions of the tantalum mask layer were removed by dry etching. The dry etching for the resist layer was carried out under the following conditions. $O_2$ gas flow rate: 40 sccm, pressure: 0.3 Pa, high frequency plasma power: 300 W, DC bias voltage: 30 W, and etching time: 10 seconds. The dry etching for the tantalum layer was carried out under the following conditions. $CF_4$ gas flow rate: 50 sccm, pressure: 0.6 Pa, high frequency plasma power: 500 W, DC bias voltage: 60 W, and etching time: 30 seconds.

Then the exposed surface portions of the magnetic layer corresponding to the removed depressed portions of the resist layer and the tantalum mask layer were removed by ion milling using an Ar ion. The ion milling conditions were as follows. High frequency output power: 800 W, acceleration voltage: 500 V, pressure: 0.014 Pa, argon gas flow rate: 5 sccm, and current density: 0.4 mA/cm$^2$. The thickness of the surface portions of magnetic layer removed by the ion-milling (depth in the magnetic layer formed by the ion-milling) was 0.1 nm in Example 1, 1 nm in Example 2, 4 nm in Examples 3-5, 6 nm in Example 6 and 11 nm in Example 7.

Thereafter, the ion-milled surface portions of the magnetic layer were exposed to a reactive plasma or a reactive ion to modify the magnetic characteristics of the surface portions of the magnetic layer. The exposure to the reactive plasma was carried out using an inductively coupled plasma (ICP) apparatus ("NE550" available from ULVAC Inc.). The plasma emission conditions were as follows. Flow rate of $CF_4$: 90 cc/min, input power: 200 W, pressure within the apparatus: 0.5 Pa, and treating time: 300 seconds. After the exposure to $CF_4$, the exposure to oxygen gas was carried out for 50 seconds.

Thereafter, residual portions of the resist layer and residual portions of the Ta mask layer, which remained on the surface of the multi-layer structure, were removed by dry etching under the following conditions. Flow rate of $SF_6$ gas: 100 sccm, pressure: 2.0 Pa, high frequency plasma power: 400 W, and treating time: 300 seconds.

Thereafter the surface of the magnetic layer was subjected to argon ion implantation using an argon gas under the following conditions. Flow rate of argon gas: 5 sccm, pressure: 0.014 Pa, acceleration voltage: 300 V, current density: 0.4 mA/cm$^2$, and treating time: 10 seconds.

Height difference (nm) between elevations and depressions in the magnetic layer are shown in Table 1, below.

A protective overcoat of carbon (DLC: diamond-like carbon) was formed by a CVD method using an RF plasma CVD apparatus. A power of 500 W was imposed at a frequency 13.56 MHz for 10 seconds. For the formation of protective carbon overcoat, a direct current pulse voltage of −150 V at a pulse width of 200 nm and a frequency of 200 kHz was imposed to the substrate.

After the formation of the protective carbon overcoat, the following characteristics of protective carbon overcoats were measured, and the results are shown in Table 1. Height difference (nm) between upper surfaces of the portions of carbon overcoat on the elevations and upper surfaces of the portions of carbon overcoat on the depressions; thickness (nm) of the carbon overcoat on the elevations; and thickness (nm) of the carbon overcoat on the depressions.

Finally the multi-layer structure was coated with a lubricant Z-dol 2000 to form a lubricant thin film with a thickness of 20 angstrom. Thus, the manufacture of a magnetic recording medium was completed.

Environmental resistance of each magnetic recording medium was evaluated by the following method. The magnetic recording medium was maintained in the air at a temperature of 80° C. and a humidity of 85% for 96 hours. Thereafter number of corrosion spots having a diameter of 5 µm or larger occurring on a surface of the magnetic recording medium was counted.

An aqueous 3% nitric acid solution was dropped onto 5 spots on a surface of the magnetic recording medium, each in an amount of 100 microliter per spot. Pure water was also dropped onto 5 spots on a surface of the magnetic recording medium, each in an amount of 100 microliter per spot. After leaving to stand for 1 hour, the specimens were collected to determine the amount of cobalt contained therein by ICP-MS. In this determination by ICP-MS, 1 milli-liter of an aqueous 3% nitric acid solution containing 200 ppm of Y was used as a reference liquid. The evaluation results are shown in Table 1.

Comparative Examples 1 to 4

Magnetic recording mediums were produced by the same procedures as described in Examples 1-7 except that the formation of protective carbon overcoats by a CVD method were carried out without imposition of a bias voltage to the substrates.

Characteristics of carbon overcoats and environmental resistance of magnetic recording mediums were evaluated. The results are shown in Table 1.

TABLE 1

| Examples and Comparative Examples | Height difference in magnetic recording patteren (nm) *1 | Height difference in carbon overcoat (nm) *2 | Thickness of carbon overcoat on elevations (nm) *3 | Thickness of carbon overcoat on depressions (nm) *4 | Corrosion spots (no/plane) *5 | Amount of corrosion (μg/plane) *6 |
|---|---|---|---|---|---|---|
| Ex. 1 | 0.3 | 2.3 | 5 | 3 | 1 | 0.09 |
| Ex. 2 | 2 | 3 | 4 | 3 | 0 | 0.08 |
| Ex. 3 | 5 | 6 | 5 | 4 | 1 | 0.11 |
| Ex. 4 | 5 | 9 | 7 | 3 | 2 | 0.12 |
| Ex. 5 | 5 | 9 | 9 | 5 | 0 | 0.09 |
| Ex. 6 | 7 | 10 | 10 | 7 | 0 | 0.16 |
| Ex. 7 | 12 | 15 | 7 | 4 | 1 | 0.13 |
| Com. Ex. 1 | 5 | 5 | 3 | 3 | 10 | 0.34 |
| Com. Ex. 2 | 5 | 3 | 3 | 5 | 29 | 0.45 |
| Com. Ex. 3 | 10 | 8 | 3 | 5 | 19 | 0.39 |
| Com. Ex. 4 | 10 | 8 | 5 | 7 | 8 | 0.21 |

*1 Height difference between elevations and depressions in magnetic recording pattern
*2 Height difference between upper surfaces of portions of carbon overcoat on elevations and upper surfaces of portions of carbon coat on depressions
*3 Thickness of carbon overcoat on elevations of magnetic recording pattern
*4 Thickness of carbon overcoat on depressions of magnetic recording pattern
*5 Number of corrosion spots on plane of magnetic recording medium
*6 Amount of corrosion on plane of magnetic recording medium

INDUSTRIAL APPLICABILITY

The magnetic recording medium according to the present invention exhibits enhanced resistance to corrosion, especially enhanced environmental resistance, and therefore has improved durability. Its recording density is high. The magnetic recording medium can be produced with high productivity by the method of the present invention.

The invention claimed is:

1. A method for producing a magnetic recording medium comprising a magnetic layer having a magnetic recording pattern comprising elevations constituting magnetic recording regions and depressions constituting boundary regions for partitioning the magnetic recording regions, and a continuous protective carbon overcoat on the magnetic layer, wherein the method comprises the following steps (a) through (f) which are carried out in this order:
   (a) forming a continuous magnetic layer on a surface of a non-magnetic substrate;
   (b) forming a mask layer for forming a magnetic recording pattern on the magnetic layer;
   (c) subjecting the mask layer to patterning;
   (d) subjecting, to ion-milling, regions to be formed into boundary regions for partitioning magnetic recording regions in the magnetic layer, while the mask layer remains on the regions to be formed into the magnetic recording regions, whereby elevations constituting the magnetic recording regions and depressions constituting the boundary regions are formed in the magnetic layer;
   (e) removing the mask layer; and then,
   (f) forming by a CVD method a continuous protective carbon overcoat on the magnetic layer, in a manner such that portions of the carbon overcoat located on the magnetic recording regions-constituting elevations of magnetic layer are thicker than portions of the carbon overcoat located on the boundary regions-constituting depressions of magnetic layer;
   and wherein the method further comprises a procedure selected from the following procedures [1], [2] and[3]:
   [1] a procedure of forming the protective carbon overcoat by a CVD method while a bias voltage is imposed to the substrate in the protective carbon overcoat-forming step (f),
   [2] a procedure of conducting ion-implantation in the magnetic recording regions and the boundary regions in the magnetic layer after the mask layer-removing step (e) but prior to the formation of the protective carbon overcoat in the step (f), and
   [3] a procedure of conducting ion-implantation in the magnetic recording regions in magnetic layer while the mask remains on the boundary regions in magnetic layer after the mask layer-removing step (e) but prior to the formation of the protective carbon overcoat in the step (f), whereby the magnetic recording regions are roughened.

2. The method for producing a magnetic recording medium according to claim 1, which further comprises a step of modifying the magnetic characteristics of the boundary regions of magnetic layer, after the ion-milling step (d) but prior to the mask layer-removing step (e), wherein the ion-milled boundary regions are exposed to a reactive plasma or a reactive ion, or ion-implantation is carried out in the ion-milled boundary regions.

3. A magnetic recording/reproducing apparatus comprising, in combination, the magnetic recording medium produced by the method as described above in claim 1; a driving part for driving the magnetic recording medium in the recording direction; a magnetic head comprising a recording part and a reproducing part; means for moving the magnetic head in a relative motion to the magnetic recording medium; and a recording-and-reproducing signal treating means for inputting signal to the magnetic head and for reproducing output signal from the magnetic head.

4. The method for producing a magnetic recording medium according to claim 1, wherein the continuous protective carbon overcoat formed in the step (f) is such that difference in height between the upper surface of the portions of the carbon overcoat located on the elevations of the magnetic layer and the upper surface of the portions of the carbon overcoat located on the depressions of the magnetic layer is within the range of 1 nm to 10 nm; and the portions of carbon overcoat located on the elevations of the magnetic layer have a thickness in the range of 1 nm to 5 nm.

5. The method for producing a magnetic recording medium according to claim 2, wherein the boundary regions in the magnetic layer, the magnetic characteristics of which have been modified, are comprised of a non-magnetic material comprised of an oxide.

* * * * *